(12) United States Patent
Coornaert et al.

(10) Patent No.: US 12,417,123 B2
(45) Date of Patent: Sep. 16, 2025

(54) SELF-SERVICE PLATFORM INTEGRATION

(71) Applicant: SAP SE, Walldorf (DE)

(72) Inventors: Zoe Coornaert, Vannes (FR); Pierre Cottin, Paris (FR)

(73) Assignee: SAP SE, Walldorf (DE)

( * ) Notice: Subject to any disclaimer, the term of this patent is extended or adjusted under 35 U.S.C. 154(b) by 750 days.

(21) Appl. No.: 17/363,612

(22) Filed: Jun. 30, 2021

(65) Prior Publication Data

US 2023/0004435 A1 Jan. 5, 2023

(51) Int. Cl.
G06F 9/50 (2006.01)

(52) U.S. Cl.
CPC .................................. G06F 9/5027 (2013.01)

(58) Field of Classification Search
CPC .................. G06F 9/5027; G06F 9/54
See application file for complete search history.

(56) References Cited

U.S. PATENT DOCUMENTS

| | | | | |
|---|---|---|---|---|
| 8,874,038 B2* | 10/2014 | Waters | | H04B 5/72 |
| | | | | 455/66.1 |
| 8,874,541 B1* | 10/2014 | Vandehey | | G06F 16/958 |
| | | | | 707/726 |
| 9,483,775 B1* | 11/2016 | Kim | | G06Q 30/0207 |
| 10,783,564 B1* | 9/2020 | Krishnamurthy | | G06Q 30/0242 |
| 10,938,768 B1* | 3/2021 | Krishnamurthy | | H04L 51/52 |
| 11,256,387 B1* | 2/2022 | Huff | | G06F 16/907 |
| 2008/0209392 A1* | 8/2008 | Able | | G06F 8/34 |
| | | | | 717/105 |
| 2010/0106551 A1* | 4/2010 | Koskimies | | G06Q 10/10 |
| | | | | 156/1 |
| 2013/0019235 A1* | 1/2013 | Tamm | | G06F 8/65 |
| | | | | 717/170 |
| 2020/0372209 A1* | 11/2020 | Kolesov | | G06F 40/106 |

* cited by examiner

Primary Examiner — Wynuel S Aquino
(74) Attorney, Agent, or Firm — Buckley, Maschoff & Talwalker LLC

(57) ABSTRACT

Systems include reception of a first set of data from a first posting platform, determination of a plurality of field definitions based on the first set of data, each field definition including a field and attributes associated with the field, transmission of the plurality of field definitions to the first posting platform, reception of one or more modifications to the plurality of field definitions from the first posting platform, generation of a second plurality of field definitions based on the one or more modifications to the plurality of field definitions, and storage of the second plurality of field definitions.

16 Claims, 12 Drawing Sheets

Smart template wizard — 311

SampleXML | SmartXML | Template | Sending method | Response handling | Feedback — 320

— 350
— 353
— 352
— 351

| Id | Source | Name | Tag name | Display | Cdata | i18n | Always | Key only | Delete |
|---|---|---|---|---|---|---|---|---|---|
| 2 | generated | start_date | standard_fields/start_date | ✓ | | | ✓ | | |
| 1 | generated | end_date | standard_fields/end_date | ✓ | | ✓ | ✓ | | |
| 10 | posting | title | standard_fields/title | ✓ | | ✓ | ✓ | | |
| 27 | posting | reference | standard_fields/reference | ✓ | | | | | |
| 86 | posting | description | standard_fields/job_descript | ✓ | ✓ | ✓ | | | |
| 271 | posting | profile description | standard_fields/profile_descr | ✓ | ✓ | ✓ | | | |
|  | posting | company description | standard_fields/company_de | ✓ | | ✓ | | | |
|  | generated | company/name | standard_fields/company_na | ✓ | | ✓ | | | |
|  | generated | apply_url | standard_fields/application_L | ✓ | | | | | |
|  | posting | apply_email | standard_fields/application_e | ✓ | | | | | |
| 16 | posting | education level | standard_fields/education_le | ✓ | | | | | |

Field: [Pick a field]
Function: [ v ] [Add]

[Reset fields] [Save] [Generate template] — 360

| Job Requisitions | | | |
|---|---|---|---|
| 910 | Title | Description | Department |
| ☐ | Test Engineer | ~~~~~~~~~~~~~~~ | |
| ☐ | UI Developer | ~~~~~~~~~~~~~~~ | |
| ☐ | Sales Manager | ~~~~~~~~~~~~~~~ | |

Edit 920  Remove 930  Post to Job Board 940

FIG. 9

Specify field values

| Categories | Sub categories | Specializations |
|---|---|---|
| ☐ All | ☐ All | ☑ All |
| ☐ Business, Management, Economics | ☐ Energy, Electricity | ☑ IT |
| ☑ Engineering, Technology, Sc | ☑ IT | ☑ Artificial Intelligence |
| ☐ Health, Medical, Paramedical | ☐ Industrial technology | ☑ Computer Applications |
| ☐ Humanities, Literature | ☐ Mathematics | ☑ Computer Science |
| ☐ Information, Media, culture | ☐ Mechanical, Aeronautical | ☐ Computer maintenance |
| ☐ Politics, Law, Adm. | ☐ Physics, Chemistry, Material sciences | ☑ Data base |
| ☐ Secretariat, Home, Tourism | ☐ Science and Environment | ☑ Digital imaging, image processing |
| ☐ Sport | ☐ Transport, Logistics | ☑ E-commerce, e-management |

Track

| | | | |
|---|---|---|---|
| ☑ High school > | ☐ Bac Pro | ☐ CAP | ☐ Other |
| ☐ Associate > | ☐ BTS | ☐ DUT | ☐ Other |
| ☐ Bachelor > | ☐ License | ☐ Professional license | ☐ Other |
| ☐ Graduate > | ☐ Engineering schools | ☐ School of business | ☐ Magisterium |
| | ☐ Professional master | ☐ Master | ☐ Other |
| ☐ Postgraduate > | ☐ MBA | ☐ Ph.D. | ☐ Specialized masters |
| | ☐ Medical / Pharma | ☐ Other | |

Locations

☐ All
☐ Canada
☐ South Africa
☐ United states

< Select a country

FIG. 11

SELF-SERVICE PLATFORM INTEGRATION

BACKGROUND

Modern software applications enable efficient execution of tasks. Such tasks may include generation, storage and analysis of data records, and communication with other applications or services based on such data records. For example, a user may operate an application to create a record, to select one or more websites, and to transmit the record to the one or more selected websites. Each of the selected websites may be configured to receive data records in a particular format, and the application therefore formats a data record in accordance with a respective particular format prior to transmission to a website.

Establishing and maintaining the technical details (data structure, protocol, etc.) which govern communication between an application and various third-party platforms such as websites may include multiple stakeholders and manual actions, and thereby consume an unacceptable amount of time and resources. In one example, a recruiting application may include software modules which enable a user to create a job requisition, to select multiple third-party job posting platforms (i.e., job boards), and to transmit the job requisition to the selected job boards. In order to enable the recruiting application to transmit a job requisition to a particular job board, the recruiting application must be configured to transmit the job requisition in conformance with technical specifications which govern communication with the job board.

Configuration typically begins with a request from a user to integrate a new job board with the recruiting application. A provider of the recruiting application prioritizes the request within a queue and, once the request rises to the top of the queue, the provider discusses technical specifications with job board personnel. Agreement on the technical specifications is reached, and the development activities which are required to configure the recruiting application based on the technical specifications are queued based on priority. Once the development activities are performed, the configuration is tested by the provider of the recruiting application and validated by the job board. The thusly-configured application is placed into production if testing and validation are successful.

The foregoing process must occur independently with respect to each job board to which a recruiting application intends to transmit job requisitions. This process may therefore require an unacceptable amount of time and resources. These issues are exacerbated in the case of certain types of third-party platforms, such as job boards, which are rapidly increasing in number and complexity. Systems are therefore desired to facilitate integration between an application and a third-party platform.

BRIEF DESCRIPTION OF THE DRAWINGS

FIG. 4 is a view of a user interface to define markup language fields and associated attributes according to some embodiments.

FIG. 9 is a view of a user interface to specify a job requisition for posting to a job board according to some embodiments.

FIG. 11 is a view of a user interface for completing fields associated with job boards according to some embodiments.

DETAILED DESCRIPTION

The following description is provided to enable any person in the art to make and use the described embodiments and sets forth the best mode contemplated for carrying out some embodiments. Various modifications, however, will be readily-apparent to those in the art.

Some embodiments relate to systems which facilitate integration between an application and heterogeneous external platforms (e.g., websites, portals, data aggregators). According to some implementations, an integration service is provided by which a third party may initiate and substantially configure an application for communication with an external platform while reducing a need for corresponding manual actions by a provider/developer of the application. Embodiments may therefore conserve development and management resources while speeding the establishment of integrations between an application and external platforms. For users of the application, embodiments may increase transparency surrounding such an integration because the users may simply request a third-party platform to initiate integration with the application, without having to unduly rely on the provider/developer of the application to do so.

Figure 1:
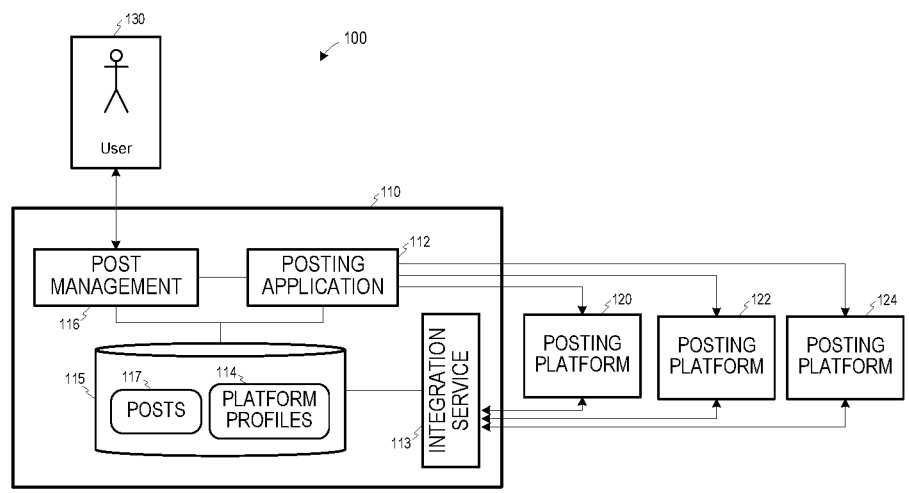
FIG. 1 is a block diagram of an architecture to integrate heterogeneous posting platforms with a posting application according to some embodiments.

FIG. 1 is a block diagram of an architecture of system 100 according to some embodiments. The illustrated elements of system 100 may be implemented using any suitable combination of computing hardware and/or software that is or becomes known. In some embodiments, two or more elements of system 100 are implemented by a single computing device. Two or more elements of system 100 may be co-located. One or more elements of system 100 may be implemented as a cloud service (e.g., Software-as-a-Service, Platform-as-a-Service). A cloud-based implementation of any elements of system 100 may apportion computing resources elastically according to demand, need, price, and/or any other metric.

Application platform 110 may comprise an on-premise, cloud-based, or hybrid computing platform providing an execution platform and services to software applications. Application platform 110 may comprise one or more virtual machines executing program code of an application server. The software applications may comprise program code executable by one or more processing units (e.g., Central Processing Units (CPUs), processor cores, processor threads) of application platform 110 to provide various functions.

Posting platforms 120, 122 and 124 may each comprise an on-premise, cloud-based or hybrid computing system which may accept data from one or more applications executing on application platform 110. Such data will be referred to herein as "posts" and may comprise any data that is or becomes known. Posting application 112 may provide functionality for transmitting such data (i.e., posting posts) to selected ones of posting platforms 120, 122 and 124. According to some embodiments, posts received by one of posting platforms 120, 122 and 124 from posting application 112 may be viewed by users of the posting platform. The users, the provider of the posting platform, and the provider of posting application 112 may be unrelated entities. Specific embodiments thereof will be described below.

Two or more of posting platforms 120, 122 and 124 may have different technical requirements associated with posts received from posting application 112 (or from any other posting system). That is, input data to be received and posted by posting platform 120, for example, must be in a different format and/or transmitted via a different protocol than input data to be received and posted by posting platform 122. Posting platform 124 may require input data of yet a third format and/or protocol.

Application platform 110 also includes program code of integration service 113. Although illustrated separately in FIG. 1, integration service 113 may comprise a component, module, etc. of posting application 112 according to some embodiments. Integration service 113 allows a third party (i.e., different from a provider of posting application 112) to specify technical and other details of a posting platform. The technical details will be referred to as a profile and may include a data structure, attributes of various fields of the data structure, a transmission protocol, a name, a logo, contact details, etc. In some embodiments, integration service 113 provides a portal which may be accessed over the Web.

FIG. 1 shows direct communication between integration service 113 and posting platforms 120, 122 and 124. In some embodiments, a developer of a posting platform connects (i.e., logs on) to the posting platform in an administrator role and accesses integration service 113 via the posting platform. It should be noted that integration service 113 may be accessed directly by a separate computing device/system. For example, a developer of posting platform 122 may execute a Web browser on a laptop/desktop computer to access a Web portal provided by integration service 113 and provide profile information thereto, independent of posting platform 122.

Platform profiles 114 include profiles provided by posting platforms via integration service 113. Platform profiles 114 may be stored in any suitable format within data store 115. Data store 115 may comprise any suitable storage system such as a database system, which may be partially or fully remote from compute elements of platform 110, and may be distributed as is known in the art.

As further shown in FIG. 1, user 130 may access post management application 116 executing on application platform 110. Post management application 116 may allow user 130 to compose a post for posting to one or more posting platforms. As will be described below, such a post may comprise a job requisition, but embodiments are not limited to any particular type of data. Post management application 116 may store posts in posts 117 of data store 115, and read, update and delete posts therefrom.

User 130 may further operate post management application 116 to select, via posting application 112, one or more posting platforms to which a post should be transmitted. In some embodiments, user 130 may access posting application 112 directly to select a post of posts 117 and one or more posting platforms to which to transmit the selected post. In either case, posting application 112 identifies a platform profile of platform profiles 114 which corresponds to each selected posting platform and transmits the post to each selected posting platform based on the corresponding profile.

Transmission of a post to a posting platform may comprise formatting the post according to the technical formatting details of a corresponding one of platform profiles 115 and transmitting the post according to the transmission details of the corresponding platform profile. In a case that two selected posting platforms are associated with different platform profiles, transmission of a post to each selected posting platform may require posting application 112 to format the post according to two different sets of technical formatting details and to transmit the post via two different transmission protocols.

Post management application 116 and posting application 112 may comprise elements of a suite of applications provided by platform 110. Each application in the suite may communicate with other applications of the suite via respective Application Programming Interfaces (APIs). In this example, user 130 may access a landing Web page of the suite of applications, provide suitable credentials, and then be presented with an interface allowing selection of post management application 116, posting application 112, and any other applications of the suite.

Figure 2:
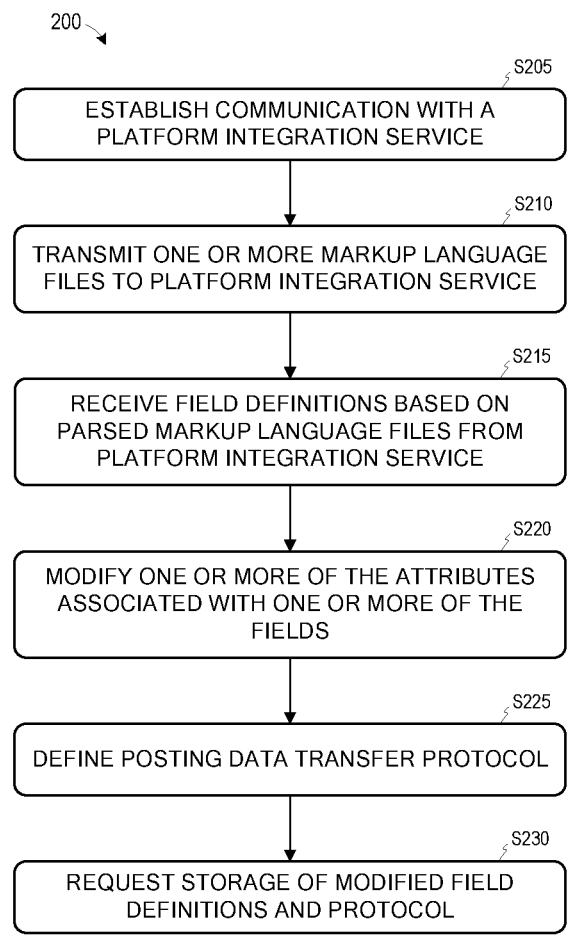
FIG. 2 comprises a flow diagram of a process to integrate a posting platform with a posting application according to some embodiments.

FIG. 2 comprises a flow diagram of process 200 to integrate a posting platform with a posting application according to some embodiments. Process 200 will be described with respect to the elements of system 100, but embodiments are not limited thereto.

Process 200 and all other processes mentioned herein may be embodied in processor-executable program code read from one or more of non-transitory computer-readable media, such as, for example, a hard disk drive, a volatile or non-volatile random access memory, a DVD-ROM, a Flash drive, and a magnetic tape, and then stored in a compressed, uncompiled and/or encrypted format. A processor may include any number of microprocessors, microprocessor cores, processing threads, or the like. In some embodiments, hard-wired circuitry may be used in place of, or in combination with, program code for implementation of processes according to some embodiments. Embodiments are therefore not limited to any specific combination of hardware and software.

Process 200 may be initiated by a customer of a posting application. For example, the customer (e.g., user 130 in FIG. 1) may wish to operate a posting application (e.g., posting application 112) to post data to a posting platform (e.g., 120, 122 or 124) with which the posting application is currently not able to communicate. The customer may therefore contact a provider of the posting platform and request the posting platform to initiate an integration with the posting application. In another example, a provider of a posting platform may independently initiate an integration with the posting platform. For example, a respective administrator of each posting platform 120, 122 and 124 may interact with application platform 110 such that after completion of process 200 by each administrator, each platform 120, 122 and 124 will be better able to communicate more efficiently with customers (not shown in FIG. 1)

seeking services from the various platforms. Embodiments are not limited to these examples.

Process 200 begins at S205, at which communication with an integration service (e.g., integration service 113) is established. In this regard, the integration service may include a set of Web pages associated with a publicly-accessible Uniform Resource Locator (URL). The Web pages may be used to receive and provide information as described below. S205 may comprise operation of a computing device operated by a provider or administrator of a posting platform to execute a Web browser and direct the Web browser to the URL of the integration service. Process 200 may utilize any other suitable metaphor for exchanging information with an integration service.

At S210, one or more markup language files are transmitted from the posting platform to the integration service. According to some embodiments, the markup language files are eXtended Markup Language (XML) files which conform to a preferred and/or required input data format of the posting platform. The one or more files may be provided in any known manner, including but not limited to File Transfer Protocol (FTP) and upload to a secure cloud-based storage location.

Field definitions are received by the posting platform from the integration service at S215. The field definitions are determined by the integration service based on the provided one or more markup language files. Each field definition specifies a field and one or more attributes of the field. The field definitions facilitate configuration of an XML template which may be used as described above.

According to some embodiments, the posting platform provider may modify the received field definitions at S220. The modifications may modify, add or remove fields, or modify, add or remove attributes for a given field. Modification of the field definitions and attributes may also include specification of a pick-list of allowed values for one or more of the fields.

The posting platform defines a transfer protocol for receiving posting data from the integration service at S225. Next, at S230, the posting platform requests the integration service to store of the field and attribute definitions and transfer protocol.

Figure 3:
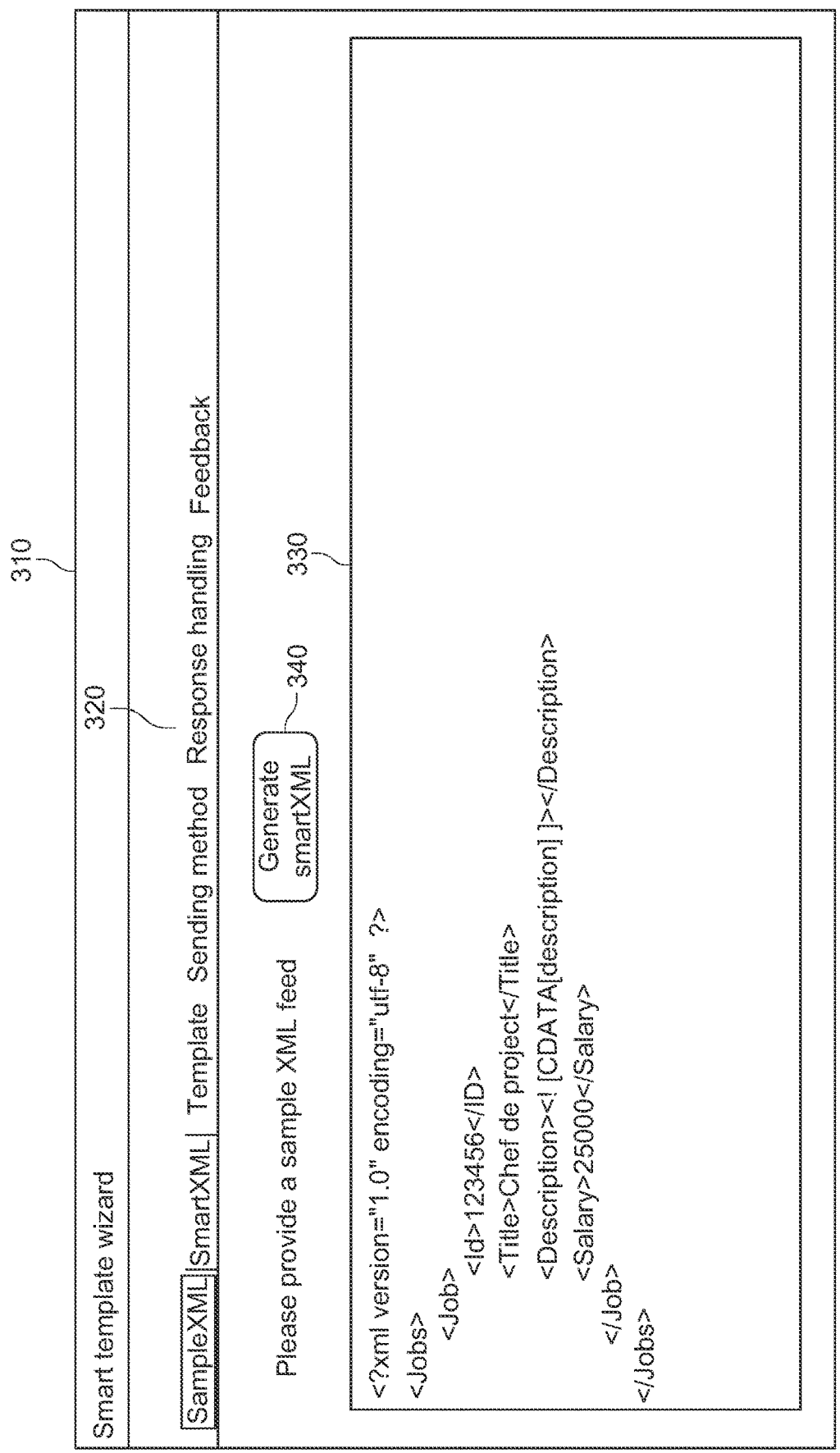
FIG. 3 is a view of a user interface to provide a markup language sample according to some embodiments.

FIG. 3 illustrates user interface 310 for providing one or more markup language files to an integration service at S210 according to some embodiments. User interface 310 may comprise a Web page provided by the integration service to a Web browser operated by a provider of a posting platform as described above. For example, an administrator of a posting platform may access an administrator home page of the posting platform, which in turn includes a hyperlink associated with the integration service and selectable to initiate integration of a posting platform.

Selection of such a hyperlink (unshown) may result in display of user interface 310 by the Web browser. User interface 310 includes several tabs 320 comprising a "smart template wizard". The smart template wizard is intended to generate a markup language template to be associated with the posting platform (e.g., within a platform profile) and to be used by the posting application to format data and transmit the formatted data to the posting platform.

User interface 310 of FIG. 3 displays the contents of the SampleXML tab 320. SampleXML tab 320 includes input area 330 for inputting a sample markup language file which conforms to an input format suitable to the posting platform. In some embodiments, a posting platform provider simply pastes an example XML feed into input area 330. SampleXML tab 320 may be configured to accept multiple markup language files in some embodiments. The posting platform administrator may select Generate SmartXML control 340 to submit the markup language file(s) to the integration service at S210.

FIG. 4 shows UI 311 displaying SmartXML tab 320. SmartXML tab 320 includes form 350 presenting fields definitions at S215 according to some embodiments. Form 350 specifies fields 351 and, for each field 351, XML tag name 352 and other attributes 353. As shown in FIG. 4, Display attribute 353 indicates whether the field should be displayed to a user of the posting application when posting to posting platform, the CData attribute 353 indicates whether the field includes XML character data, and the i18n attribute 353 indicates whether data of the field should be subjected to internationalization and localization. Embodiments are not limited to attributes 353. For example, an attribute may indicate whether a field is required (i.e., a job posting based on these field definitions must include a value for the field) or optional (i.e., the job posting may include a value for the field, but a value if not required).

According to some embodiments, the integration service includes a parser to parse the provided one or more markup language files, determine field definitions therefrom, and generate form 350 based thereon. The parser parses the one or more markup language files to identify fields within the files and to identify attributes of the fields based on the markup language files. Form 350 is then generated with checkboxes associated with various attributes 353 pre-checked based on the determined fields and attributes.

According to some embodiments, the posting platform provider may modify form 350 at S220 to modify, add or remove fields, and to modify, add or remove attributes for a given field (e.g., via the checkboxes associated with attributes 353). Once the fields and attributes are satisfactorily defined, the provider may select Generate Template control 360.

Figure 5:
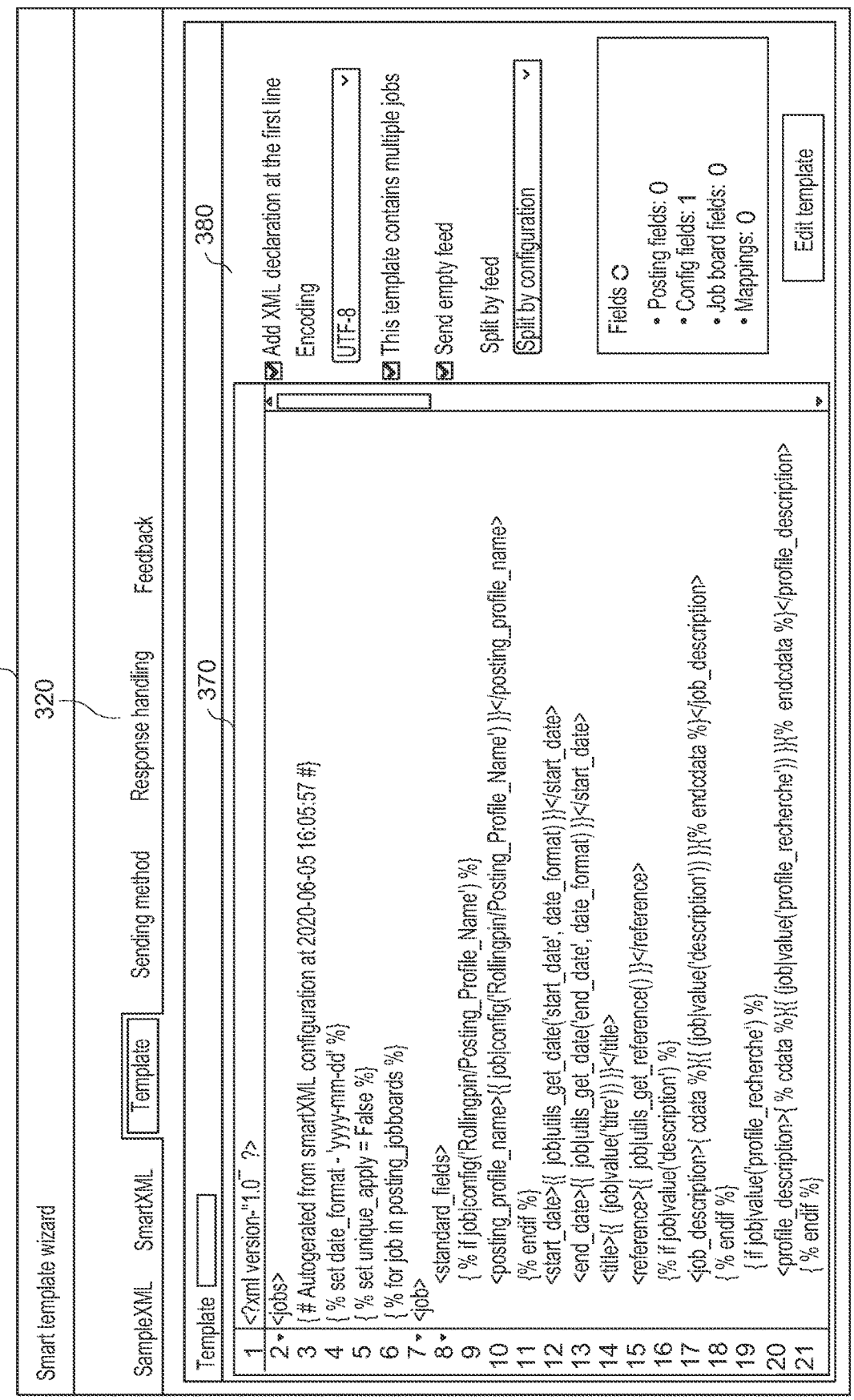
FIG. 5 is a view of a user interface to review and confirm a markup language template according to some embodiments.

After receiving confirmation from the administrator via selection of Generate Template control 360, the integration service returns UI 312 to the administrator as shown in FIG. 5. Template tab 320 primarily displays template 370, which may have been generated based on the field and attribute definitions of form 350. Template 370 specifies the format of an XML feed for input to the posting platform. Template tab 320 also includes controls 380 for specifying features of and editing template 370.

Figure 6:
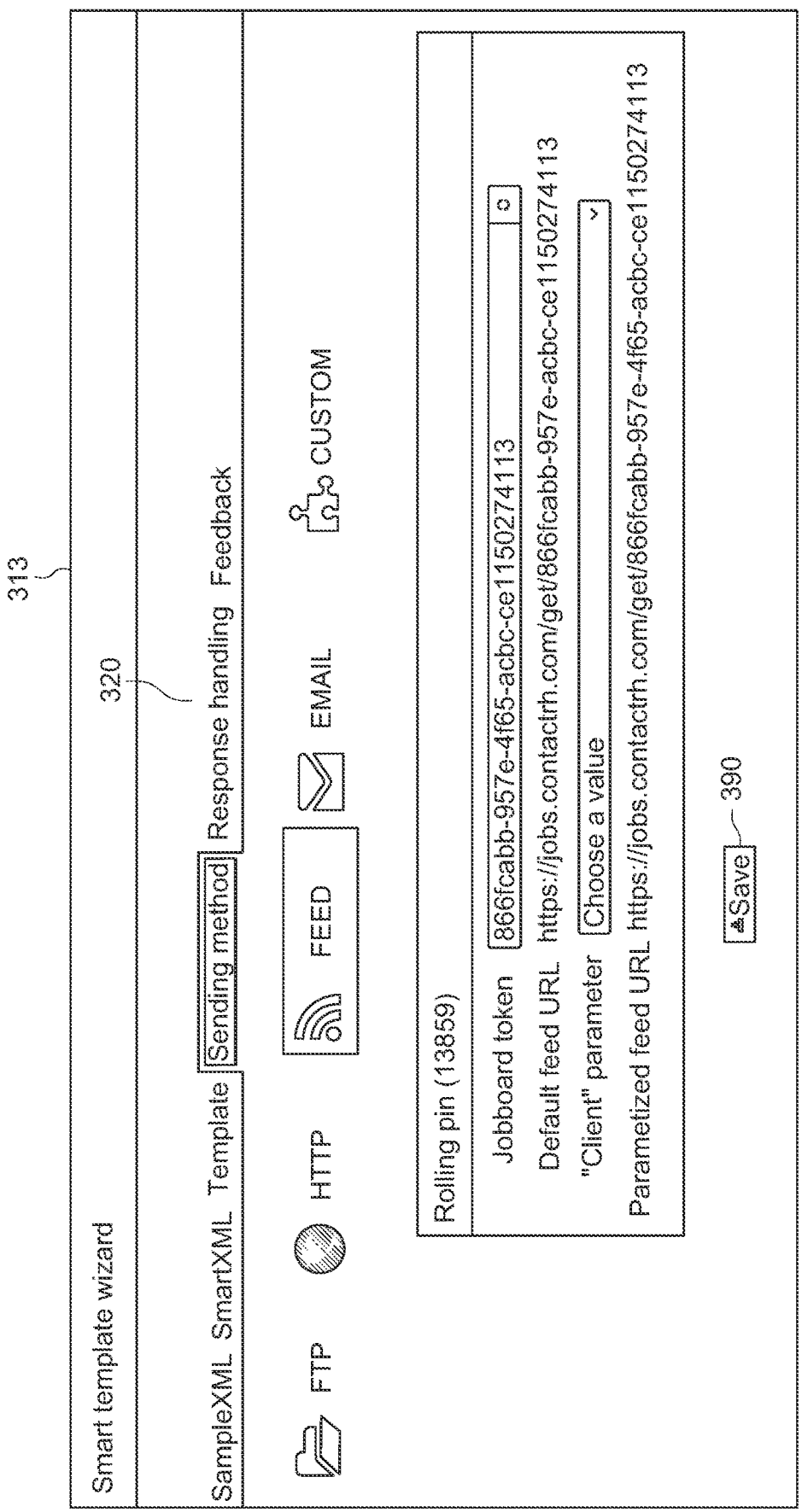
FIG. 6 is a view of a user interface to specify a data transfer protocol according to some embodiments.

Sending method tab 320 allows definition of a transfer protocol at S225 in some embodiments. Sending method tab 320 of FIG. 6 provides five protocol options but embodiments are not limited thereto. Sending method tab 320 also allows specification of a token to identify the posting application to the posting platform and an optional client parameter which allows the posting platform to identify posts received from a posting application on behalf of different customers of the posting application.

Save control 390 initiates a request to store the field and attribute definitions and transfer protocol at S230. With respect to FIG. 1, selection of Save control 390 may cause integration service 113 to store a corresponding platform profile 114 in data store 115. The platform profile 114 may include the field and attribute definitions and transfer protocol information, and may also include, for example, a platform name, a platform logo, a list of supported countries and languages, a description (e.g., in several languages), a sales contact, and a technical contact. Use of such a stored platform profile 114 according to some embodiments will be described in detail below.

Figure 7:
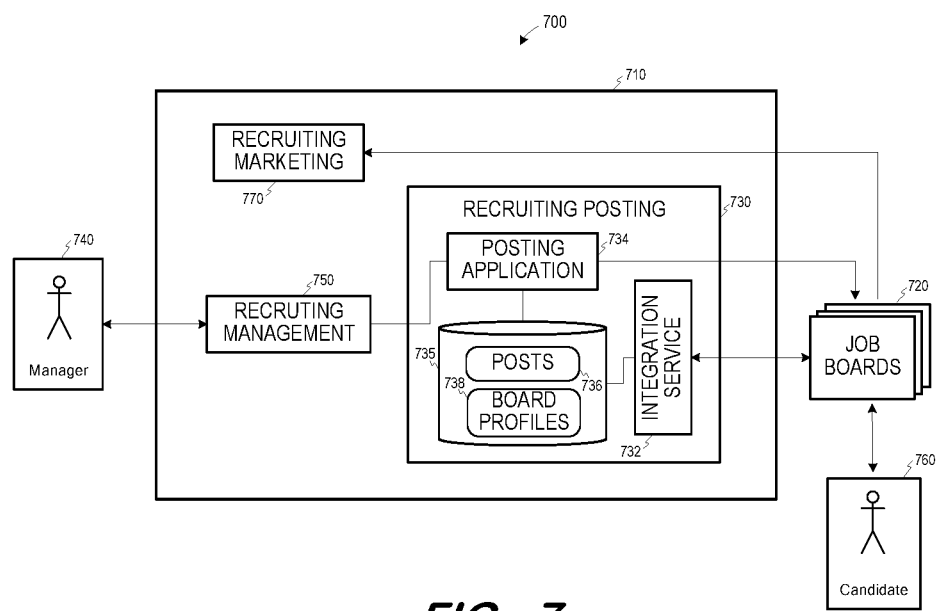
FIG. 7 is a block diagram of an architecture including a recruiting application and a plurality of job boards integrated therewith according to some embodiments.

FIG. 7 illustrates an embodiment in which the above-described posting platforms are online job boards and the posts are job requisitions. As described with respect to application platform 110, application platform 710 may comprise an on-premise, cloud-based, or hybrid computing platform providing an execution platform and services to software applications. Job boards 720 may each comprise an on-premise, cloud-based or hybrid computing system which is integrated with recruiting posting application 730. Job boards 720 may be selected to match various recruitment strategies of manager 740 of a given customer. In some embodiments, a single company or entity owns, controls or manages multiple job boards (e.g., accepting fees for allowing recruiters to place job openings on one of the job boards), and some embodiments include multiple companies or entities which own, control or manage a plurality of job boards that interact with application platform 710.

Generally, manager 740 may generate a job requisition using recruiting management application 750. Via recruiting management application 750, manager 740 may select one or more of job boards 720 on which to post the job requisition. Each of the selected job boards 720 may be associated with a respective board profile of board profiles 738 stored in data store 735. At least one of the respective board profiles may have been generated and stored in data store 735 by a job board 720 in conjunction with integration service 732 as described with respect to process 200 and integration service 113. Data store 735, board profiles 738 and posts 736 may be examples of the more generic depictions of data store 115, platform profiles 114 and posts 117 of FIG. 1.

Each of board profile 738 of the selected job boards 720 may define fields whose attributes indicate that the fields are required or optional, as will be described further in conjunction with the description of FIG. 8. Posting application 734 prompts manager 740 to provide values for these fields prior to transmitting the job requisition to the selected job boards. Then, for each selected job board of job boards 720, posting application 734 of recruiting posting component 730 formats and transmits the job requisition to the job board based on the board profile associated with the job board.

Job boards 720 may communicate posted job requisitions to candidate 760 in any manner that is or becomes known. For example, candidate 760 may establish a subscription with a job board 720 to receive notices (e.g., via e-mail or text) of posted job requisitions which are associated with certain characteristics (e.g., particular location, particular position, particular degree requirement). Candidate 760 may also directly access a job board 720, with or without login credentials, to browse job requisitions posted thereto.

According to some embodiments, candidate 760 may respond to a job requisition via a job board 720 to which the job requisition is posted. For example, the job board 720 may include a "Send resume and cover letter" hyperlink which candidate 760 may select to upload documents to recruiting marketing application 770 of platform 710. Recruiting marketing application 770 may be operated by manager 740 or other human resources personnel to facilitate the organization and review of communications received from candidates.

Recruiting management application 750, posting application 734 and recruiting marketing application 770 may comprise elements of a suite of applications provided by platform 710. Manager 740 may access a home Web page of platform 710, provide suitable credentials, and be presented with an interface allowing selection of one of the applications. Each application may communicate with other applications of the suite via respective APIs.

Figure 8:
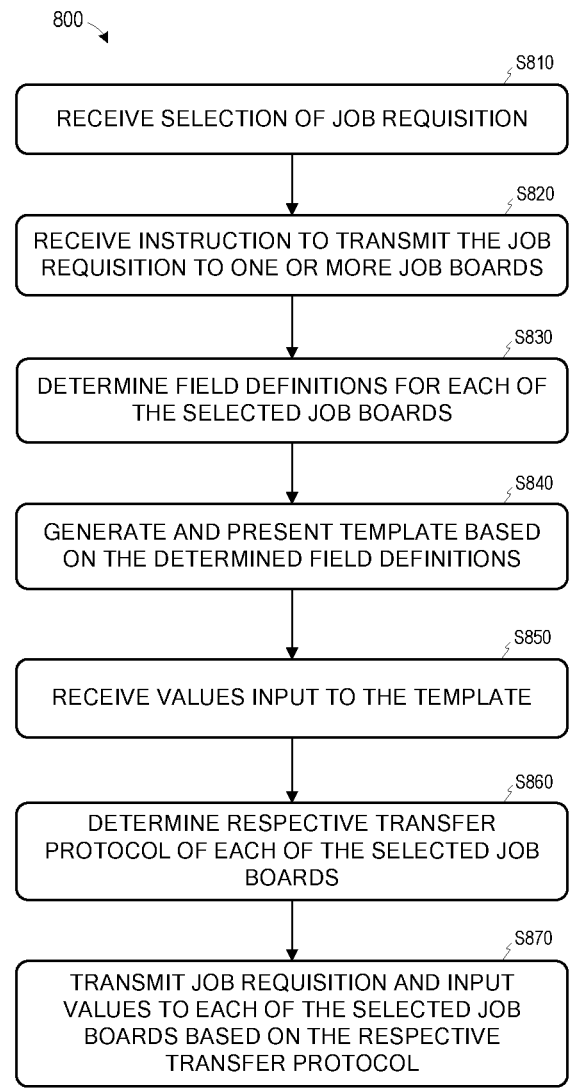
FIG. 8 comprises a flow diagram of a process executable by a recruiting application to post a job requisition to a job board integrated therewith according to some embodiments.

FIG. 8 is a flow diagram of process 800 to transmit a job posting to a job board according to some embodiments. The job board may be integrated with a job posting application as described above with respect to process 200. Process 800 may be implemented by processor-executable program code of a job posting application.

A selection of a job requisition is received at S810. A job requisition may describe a job position and may include, for example, a title, a list of qualifications, a location, a salary, a list of benefits, and contact information. According to some embodiments, S810 comprises receipt of a selection of a job requisition from a list of previously-created job requisitions. In other embodiments, a job requisition may be generated from scratch without relying on a previously-created job requisition. In such embodiments, the selection of a job requisition occurs after performing text editing to create the job requisition.

FIG. 9 is a view of UI 900 according to some embodiments. UI 900 may be displayed on a computing device operated by manager 740 of FIG. 7. In particular, manager 740 may operate the computing device to access a home page associated with recruiting management application 750 executing on platform 700. Manager 740 may navigate from the home page to a list of previously-stored job requisitions as shown in UI 900.

Each of the job requisitions listed on UI 900 is associated with a checkbox 910 to allow selection thereof. Controls 920, 930 and 940 initiate a corresponding action upon a job requisition for which checkbox 910 is selected. According to some embodiments, selection of Post to Job Board control 940 results in reception at S810 of a selection of a job requisition to post to a job board. Embodiments are not limited to UI 900.

Next, an instruction to transmit the selected job requisition to one or more job boards is received at S820. Continuing the above example, selection of control 940 of UI 900 may result in display of UI 1000 of FIG. 10. UI 1000 presents job title 1010 associated with the job requisition selected at S810. UI 1000 also presents several selectable job boards. According to some embodiments, the displayed job boards are each associated with a board profile 738 of data store 735.

For example, selection of control 940 of UI 900 may cause recruiting management application 750 to transmit a request to posting application 734 (e.g., by calling a corresponding API). In response, posting application 734 identifies job boards from board profiles 738 and provides UI 1000 including the identified job boards. As described above, a board profile may include a logo or other descriptive information associated with a corresponding job board, and UI 1000 may present such a logo or information along with each presented job board.

Figure 10:
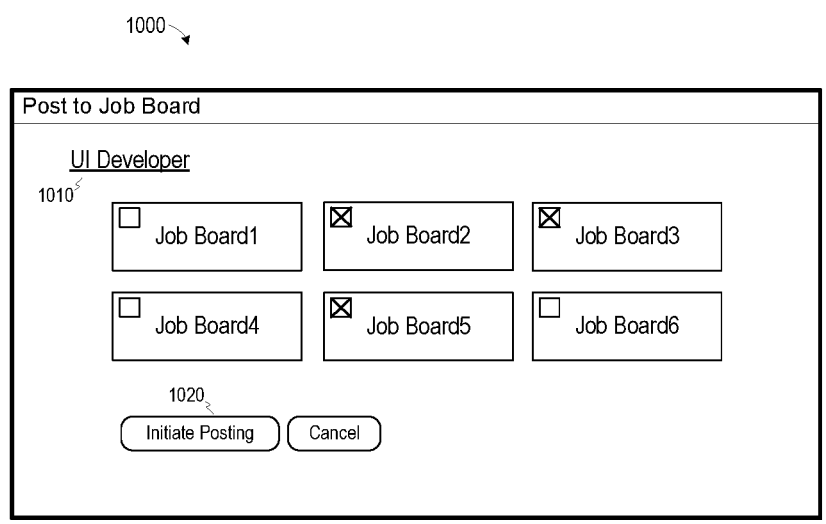
FIG. 10 is a view of a user interface to specify one or more job boards to which a job requisition is to be posted according to some embodiments.

Manager 740 has selected three job boards in the FIG. 10 example. Manager 740 may then select Initiate Posting control 1020 to submit an instruction to posting application 734 to transmit the job requisition to the three selected job boards.

Field definitions of each of the selected job boards are determined at S830. A field definition may include a name of a field and attributes associated with the field as described above. The field definitions of each selected job board may be stored in board profiles 738 and retrieved therefrom by posting application 734 in some embodiments. Moreover, the field definitions for at least one of the selected job boards may have been generated and stored by the job board as described with respect to process 200.

Based on the determined field definitions, a template is generated and presented at S840. The generated template includes fields for which values may or must be provided prior to posting the job requisition to the selected job boards. For example, each of the selected job boards may include a field Location which is associated with an attribute indicating that at least one value for the field must be provided. The template generated at S840 therefore includes an input region for indicating a value for the field Location.

As described above, a field may be associated with a pick-list of values. Two job boards may therefore be associated with a same field but the field may be associated with different pick-lists for each of the two job boards. In such a case, the template may be generated at S840 to include an input region for the field which allows any value of either pick-list to be selected.

In another example, one selected job board is associated with a field Salary and the other selected job boards are not associated with a field Salary. The template generated at S840 may therefore include an input region for indicating a value for the field Salary, to ensure that this information is collected for the one selected job board.

In some cases, one or more of the non-selected job boards may be associated with a given field while none of the selected job boards are associated with the given field. Accordingly, at S840, the generated template does not include an input region corresponding to the given field.

Values input to the template are received at S850. FIG. 11 illustrates UI 1100 which may be generated and presented at S840 according to some embodiments. UI 1100 includes input regions corresponding to fields Categories, Sub-Categories, Specialization, Track and Locations. Each of the fields is associated with a list of selectable values, and S850 may comprise selection of certain ones of the selectable values. In some embodiments, one or more of the fields may include input controls allowing manual entry of one or more values for one or more given fields.

S850 may include evaluation of whether values have been input for all required fields. As mentioned above, a field may be required by one job board but optional for another job board. If both of such job boards are selected, the field may be considered required for purposes of the evaluation at S850, since it is required by at least one job board. If a user indicates completion of the template but values have not been input for all required fields, the user may be prompted to provide the missing values prior to proceeding to S860.

At S860, a respective transfer protocol is determined for each of the selected job boards. The transfer protocol for a job board may be specified in the board profile associated with the job board, as described above. Next, at S870, the selected job requisition and the values input at S850 are transmitted to each of the selected job boards, using the respective transfer protocol determined for each job board.

The values transmitted to a particular job board may include less than all the values received at S850, for example if some of the received values are associated with fields which are not associated with the particular job board, but with other selected job boards. According to some embodiments of S870, received values associated with a particular selected job board and the job requisition are formatted into a data structure (e.g., an XML feed) defined by a corresponding board profile created per process 200, and the data structure is transmitted to the job board using a data transfer protocol which is also defined in the corresponding board profile. This process is repeated, successively or substantially in parallel, for each selected job board.

Figure 12:
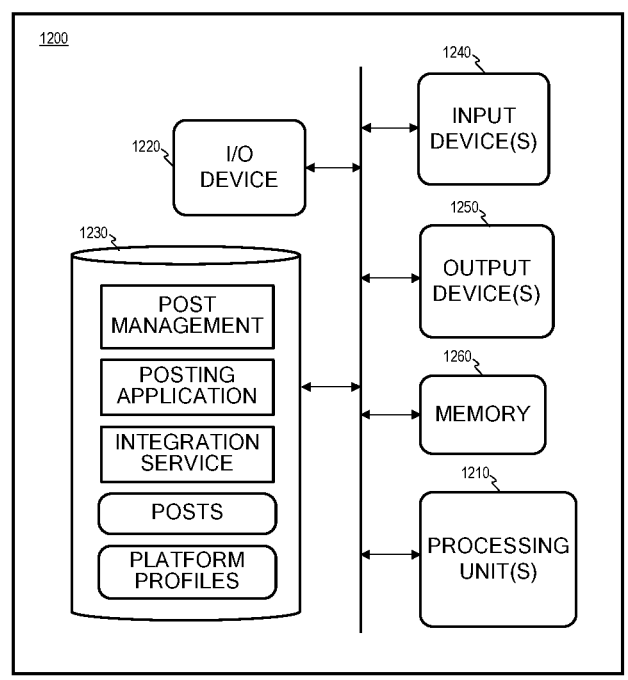
FIG. 12 is a block diagram of a hardware system for providing a recruiting application according to some embodiments.

FIG. 12 is a block diagram of a hardware system providing self-service platform integration according to some embodiments. Hardware system 1200 may comprise a computer server and may execute program code to perform any of the functions described herein. Hardware system 1200 may be implemented by a distributed cloud-based server, a virtual machine, or other implementation and may comprise an implementation of platform 110 in some embodiments. Hardware system 1200 may include other unshown elements according to some embodiments.

Hardware system 1200 includes processing unit(s) 1210 operatively coupled to I/O device 1220, data storage device 1230, one or more input devices 1240, one or more output devices 1250 and memory 1260. I/O device 1220 may facilitate communication with external devices, such as third-party posting platforms, an external network, the cloud, or a data storage device. Input device(s) 1240 may comprise, for example, a keyboard, a keypad, a mouse or other pointing device, a microphone, knob or a switch, an infra-red (IR) port, a docking station, and/or a touch screen. Input device(s) 1240 may be used, for example, to enter information into hardware system 1200. Output device(s) 1250 may comprise, for example, a display (e.g., a display screen) a speaker, and/or a printer.

Data storage device 1230 may comprise any appropriate persistent storage device, including combinations of magnetic storage devices (e.g., magnetic tape, hard disk drives and flash memory), optical storage devices, Read Only Memory (ROM) devices, and RAM devices, while memory 1260 may comprise a RAM device.

Data storage device 1230 stores program code executed by processing unit(s) 1210 to cause server 1200 to implement any of the components and execute any one or more of the processes described herein. Embodiments are not limited to execution of these processes by a single computing device. Data storage device 1230 may also store data and other program code for providing additional functionality and/or which are necessary for operation of hardware system 1200, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
a memory storing processor-executable program code; and
at least one processor to execute the processor-executable program code to cause the system to:
generate a link to an integration service application, the integration service application presenting a user interface to a user, the user interface including a smart template wizard to process one or more user inputs to generate a markup language template associated with a first posting platform;
receive multiple markup language files from a first posting platform, each of the multiple markup language files conforming to a particular input data format of the first posting platform, the first posting platform comprising a platform on which information is capable of being posted for viewing by one or more users of the first posting platform;
process the multiple markup language documents to automatically determine a first plurality of field definitions based on characteristics of the multiple markup language files, each field definition including a field and attributes associated with the field;
transmit the first plurality of field definitions to the first posting platform;
receive one or more modifications to the plurality of field definitions from the first posting platform;
determine a transfer protocol for the first posting platform;
generate a second plurality of field definitions based on the one or more modifications to the plurality of field definitions;
store a modified plurality of field definitions, the modified plurality of field definitions comprising the second plurality of field definitions and unmodified field definitions from the first plurality of filed definitions;
receive an initial post from a user and a user selection indicating that the initial post is to be posted to the first posting platform;
generate a formatted post, based on the initial post, the modified plurality of field definitions, and on the markup language template; and
transmit the formatted post to the first posting platform via the identified transfer protocol.

2. The system according to claim 1, wherein the at least one processor is further to execute the processor-executable program code to cause the system to:
receive a data transfer protocol from the first posting platform,
wherein storage of the second plurality of field definitions comprises storage of the data transfer protocol in association with the second plurality of field definitions.

3. The system according to claim 1, wherein the at least one processor is further to execute the processor-executable program code to cause the system to:
receive a second set of data from a second posting platform;
determine a third plurality of field definitions based on the second set of data, each of the third plurality of field definitions including a field and attributes associated with the field;
transmit the third plurality of field definitions to the second posting platform;
receive a second one or more modifications to the third plurality of field definitions from the second posting platform;
generate a fourth plurality of field definitions based on the second one or more modifications to the third plurality of field definitions; and
store the fourth plurality of field definitions.

4. The system according to claim 3, wherein the at least one processor is further to execute the processor-executable program code to cause the system to:
receive a first data transfer protocol from the first posting platform; and
receive a second data transfer protocol from the second posting platform,
wherein storage of the second plurality of field definitions comprises storage of the first data transfer protocol in association with the second plurality of field definitions, and
wherein storage of the fourth plurality of field definitions comprises storage of the second data transfer protocol in association with the fourth plurality of field definitions.

5. The system according to claim 4, wherein the first set of data comprises a first extended Markup Language file, and wherein the second set of data comprises a second eXtended Markup Language file.

6. The system according to claim 1, wherein the first set of data comprises an extended Markup Language file.

7. The system according to claim 1, wherein the at least one processor is to further execute the processor-executable code to cause the system to:
process a user input comprising a post to transmit to the first posting platform;
format the post based at least in part on the second plurality of field definitions; and
transmit the formatted post to the first posting platform.

8. A method comprising:
generating a link to an integration service application, the integration service application presenting a user interface to a user, the user interface including a smart template wizard to process one or more user inputs to generate a markup language template associated with a first posting platform;
receiving multiple markup language files from a first posting platform, each of the multiple markup language files conforming to a particular input data format of the first posting platform, the first posting platform comprising a platform on which information is capable of being posted for viewing by one or more users of the first posting platform;
processing the multiple markup language documents to automatically determine a first plurality of field definitions based on characteristics of the multiple markup language files, each field definition including a field and attributes associated with the field;
transmitting the first plurality of field definitions to the first posting platform;
receiving one or more modifications to the plurality of field definitions from the first posting platform;
determining a transfer protocol for the first posting platform;
generating a second plurality of field definitions based on the one or more modifications to the plurality of field definitions;
storing a modified plurality of field definitions, the modified plurality of field definitions comprising the second plurality of field definitions and unmodified field definitions from the first plurality of filed definitions;
receiving an initial post from a user and a user selection indicating that the initial post is to be posted to the first posting platform;
generating a formatted post, based on the initial post, the modified plurality of field definitions, and on the markup language template; and
transmitting the formatted post to the first posting platform via the identified transfer protocol.

9. The method according to claim 8, further comprising:
receive a data transfer protocol from the first posting platform,
wherein storage of the second plurality of field definitions comprises storage of the data transfer protocol in association with the second plurality of field definitions, and
wherein the first set of data transmitted to the first posting platform using the data transfer protocol.

10. The method according to claim 8, further comprising:
receive a second set of data from a second posting platform;
determine a third plurality of field definitions based on the second set of data, each of the third plurality of field definitions including a field and attributes associated with the field;
transmit the third plurality of field definitions to the second posting platform;
receive a second one or more modifications to the third plurality of field definitions from the second posting platform;
generate a fourth plurality of field definitions based on the second one or more modifications to the third plurality of field definitions; and
store the fourth plurality of field definitions.

11. The method according to claim 10, further comprising:
receive a first data transfer protocol from the first posting platform; and
receive a second data transfer protocol from the second posting platform,
wherein storage of the second plurality of field definitions comprises storage of the first data transfer protocol in association with the second plurality of field definitions, and
wherein storage of the fourth plurality of field definitions comprises storage of the second data transfer protocol in association with the fourth plurality of field definitions.

12. The method according to claim 8, wherein the first set of data comprises an extended Markup Language file.

13. The method according to claim 12, wherein the first set of data comprises a first eXtended Markup Language file, and wherein the second set of data comprises a second eXtended Markup Language file.

14. The method according to claim 8, further comprising:
processing a user input comprising a post to transmit to the first posting platform;
formatting the post based at least in part on the second plurality of field definitions; and
transmitting the formatted post to the first posting platform.

15. A system comprising:
a memory storing processor-executable program code;
a data store; and
at least one processor to execute the processor-executable program code to cause the system to:
generate a link to an integration service application, the integration service application presenting a user interface to a user, the user interface including a smart template wizard to process one or more user inputs to generate a markup language template associated with a first posting platform;
receive a first post and an instruction, from a user, to transmit the first post to a first posting platform, the first posting platform comprising a platform on which information is capable of being posted for viewing by one or more users of the first posting platform;
receive multiple markup language files from a first posting platform, each of the multiple markup language files conforming to a particular input data format of the first posting platform, the first posting platform comprising a platform on which information is capable of being posted for viewing by one or more users of the first posting platform;
process the multiple markup language documents to automatically determine a first plurality of field definitions associated with the first posting platform and stored in the data store based on characteristics of the multiple markup language files, each of the first plurality of field definitions including a field and attributes associated with the field;
determine a transfer protocol for the first posting platform;
format the first post according to the first plurality of field definitions and on the markup language template;
transmit the formatted first post to the first posting platform via the identified transfer protocol;
receive a second post and a second instruction, from the user, to transmit the second post to a second posting platform;
determine a second plurality of field definitions associated with the second posting platform and stored in the data store, each of the second plurality of field definitions including a field and attributes associated with the field;
format the second post according to the second plurality of field definitions; and
transmit the formatted second post to the second posting platform.

16. The system according to claim 15, the at least one processor to execute the processor-executable program code to cause the system to:
determine a first data transfer protocol associated with the first posting platform and stored in the data store; and
determine a second data transfer protocol associated with the second posting platform and stored in the data store,
wherein the formatted first post is transmitted to the first posting platform according to the first data transfer protocol, and
wherein the formatted second post is transmitted to the second posting platform according to the second data transfer protocol.

* * * * *